United States Patent [19]
Russ et al.

[11] Patent Number: 5,735,238
[45] Date of Patent: Apr. 7, 1998

[54] HEAT MANAGEMENT SYSTEM FOR INTERNAL COMBUSTION ENGINES

[75] Inventors: Stephen George Russ, Canton; William Francis Stockhausen, Northville, both of Mich.

[73] Assignee: Ford Global Technologies, Inc., Dearborn, Mich.

[21] Appl. No.: 734,643

[22] Filed: Oct. 21, 1996

[51] Int. Cl.⁶ .......................................... F04P 3/00
[52] U.S. Cl. .................. 123/41.29; 123/41.82 R; 123/12.3 B
[58] Field of Search ............... 123/41.29, 41.82 R; 237/12.3 B

[56] References Cited

U.S. PATENT DOCUMENTS

| | | | |
|---|---|---|---|
| 4,319,547 | 3/1982 | Bierling | 123/41.29 |
| 5,337,704 | 8/1994 | Roth | 123/41.1 |

OTHER PUBLICATIONS

SAE 912467, "Improvement of Toyota 4-valve Standard Engines", Matsuda et al.
SAE912469, "Development of High Performance Engine for Passenger Cars", Suematsu et al.

Primary Examiner—Noah P. Kamen
Attorney, Agent, or Firm—Jerome R. Drouillard

[57] ABSTRACT

A heat management system for an internal combustion engine utilizes recirculated liquid coolant and provides a heat intensifying circuit to hasten engine warm-up and a heat dissipation circuit for use after the engine has warmed to a predetermined operating temperature. When the engine is cold, it is operated in such a way as to maximize heat rejection to the coolant circulating in the heat intensifying circuit, which may include a heat exchanger for warming air within a passenger compartment of a vehicle. The present system optimizes the location of maximum heat transfer, minimizes the amount of coolant heated during the warm-up period and increases the heat transferred to this coolant. After the warm-up period the coolant system actively cools both the cylinder head and engine block surfaces and the engine operating strategy is returned for normal engine operation.

16 Claims, 3 Drawing Sheets

HEAT MANAGEMENT SYSTEM FOR INTERNAL COMBUSTION ENGINES

BACKGROUND OF THE INVENTION

1. Technical Field

The present invention relates to a system for improving the heat management characteristics of internal combustion engines. This system is particularly useful for engines installed in automotive vehicles.

2. Discussion of the Prior Art

Obtaining quick passenger compartment warm-up in cold weather has always been a challenge for automobile manufacturers. The usual solutions to this problem require add-on, costly hardware that is difficult to justify in terms of customer economics.

This invention relates to a heat management system that does not require more than a small amount of additional hardware, and is used in conjunction with an engine operating strategy to increase the engine coolant warm-up rate to provide heat more rapidly to a passenger compartment. The coolant flow circuit during the warm-up period includes only the pump, cooling passages on the exhaust side of the cylinder head, and the heat exchanger (heater core) for the passenger compartment. Under cold ambient temperatures, an engine operating strategy which utilizes a retarded spark timing (retarded fuel injection timing or increased exhaust system backpressure or intake throttling for a diesel engine) is used to provide high exhaust gas temperatures and increased heat rejection to the exhaust port side of the cylinder head where the coolant is circulating. After the engine is warmed up, both the engine operating strategy and the coolant flow pattern are returned to the conventional mode to provide normal engine operation with active cooling of the entire cylinder head and the engine block.

Although designers of automotive engines seeking to improve warm-up characteristics have attempted to provide divided coolant flow systems, such efforts have generally not been acclaimed as market successes. In SAE publications 912467 and 912469, an engine cooling system is shown which divides the cylinder head water jacket into the intake side and the exhaust side.

The coolant flow disclosed in these publications is quite different from that of the present invention. The SAE authors disclose a system in which coolant flows first from the coolant pump into the engine block, then into the exhaust side of the cylinder head, to the radiator and to the intake side of the cylinder head before returning to the water pump. This arrangement does not allow for the flow only through the exhaust side of the cylinder head during the warm-up period as embodied by the present invention.

In application 52-85309, published in Japan as document No. 54-20248, on Feb. 2, 1979, and in U.S. Pat. Nos. 4,319,547 and 5,337,704, a cooling system is disclosed which isolates the engine block from the coolant circuit during the warm-up period so that heated coolant flows only through the cylinder head and heater. This arrangement includes the intake side of the cylinder head, which makes it less effective and does not include a change in the engine operating strategy to increase heat transfer to the exhaust area of the coolant jacket.

SUMMARY OF THE INVENTION

A heat management system for a reciprocating internal combustion engine having a cylinder block and a cylinder head with intake and exhaust valves located within the cylinder head on intake and exhaust sides, respectively, of each cylinder, has a heat-intensifying subsystem comprising a first circuit for circulating liquid coolant exclusively between the exhaust side of the cylinder head, a first heat exchanger, and a coolant pump whenever an operating temperature of the engine is less than a first predetermined threshold. The present system further comprises a heat dissipation subsystem comprising a second circuit for circulating liquid coolant between the cylinder block, the intake side of the cylinder head, the exhaust side of the cylinder head, and a second heat exchanger whenever an operating temperature of the engine exceeds a second predetermined threshold.

According to another aspect of the present invention, the heat dissipation subsystem comprises passages for circulating coolant around the cylinder on both the intake and exhaust sides of the cylinder.

According to yet another aspect of the present invention, a controller operates the engine so as to maximize the rate of rejection of heat to the engine coolant whenever an operating temperature of the engine is less than a third predetermined threshold.

When used with a spark ignited engine, the present heat management system may further comprise a controller for retarding the spark timing of the engine so as to maximize the rate of rejection of heat to the engine coolant whenever an operating temperature of the engine is less than a third predetermined threshold.

When used with a compression ignition engine, the present heat management system may further comprise a controller for increasing exhaust system pressure or for altering the fuel injection timing or for throttling the intake airflow so as to maximize the rate of rejection of heat to the engine coolant whenever an operating temperature of the engine is less than a third predetermined threshold.

DETAILED DESCRIPTION OF PREFERRED EMBODIMENTS

Figure 1:
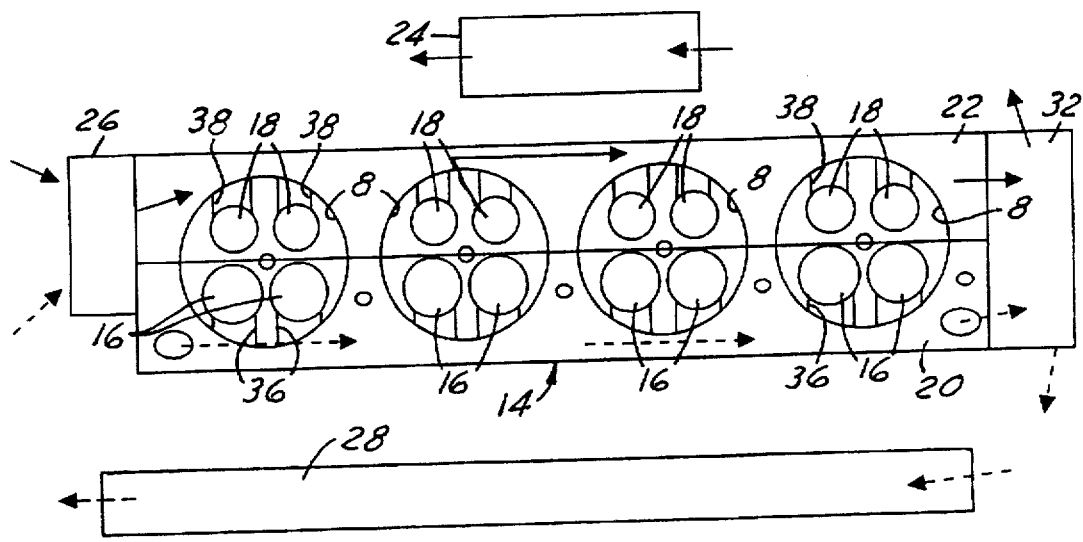
FIG. 1 is a plan view, partially schematic representation of an engine equipped with a heat management system according to the present invention.

This invention is directed to a new heat management system for automotive engines, including an operating strategy to improve passenger compartment warm-up under cold ambient temperatures (<70° F. ). Referring to FIG. 1, this system is shown applied to an I-4 engine with a parallel flow cooling system. Those skilled in the art will appreciate in view of this disclosure that a heat management system according to the present invention could be applied to many types of reciprocating internal combustion engines such as inline and vee block multicylinder engines of many stripes.

Figure 2:
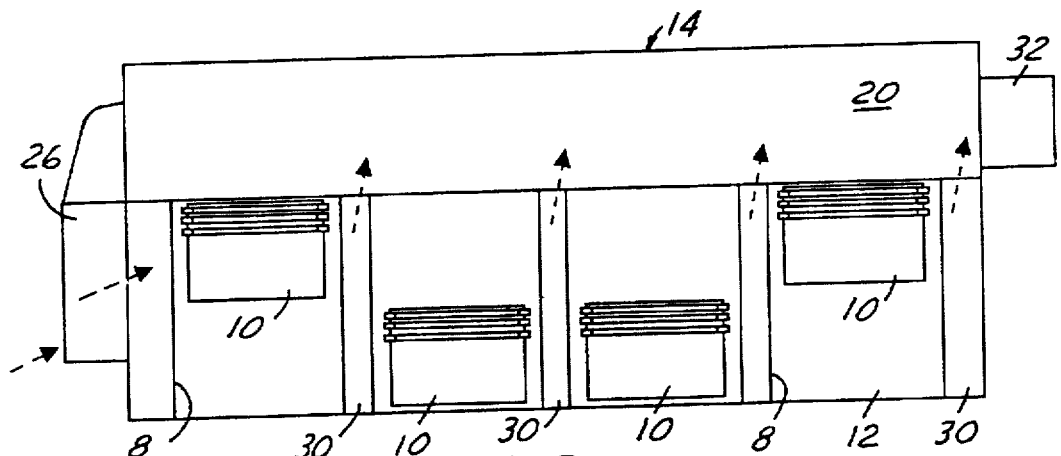
FIG. 2 is a side elevation, of the partially schematic representation of FIG. 1.

As shown in FIGS. 1 and 2, an engine having four cylinders 8, with each housing a piston 10, has cylinder block 12 and cylinder head 14. A plurality of intake valves 16 and exhaust valves 18 is housed in cylinder head 14. Intake valves 16 control the flow through intake ports 36, and exhaust valves 18 control the flow through exhaust ports 38.

Cylinder head 14, including its coolant passages, is divided into separate intake side 20 and exhaust side 22. A heat management system according to the present invention is intended to confine the flow of circulating coolant exclusively to exhaust side 22 until such time as the engine has rejected sufficient heat to the coolant that circulation through the entire cooling system is warranted. This initial circulation through only exhaust side 22 of cylinder head 14 allows the circulating coolant to pick up heat from exhaust ports 38 and from the exhaust side of the combustion chambers (not shown). Thus, heat flux to the coolant is concentrated or intensified by this heat intensifying subsystem. The heat intensifying subsystem comprises exhaust side 22 of cylinder head 14, first heat exchanger 24, which may comprise a passenger compartment heater for a vehicle, and coolant pump 26. It should be noted that during any period in which a selected operating temperature of the engine, such as the coolant temperature within the heat intensifying subsystem is less than a predetermined threshold, no coolant will be allowed to circulate through either intake side 20 of cylinder head 14, or through coolant passages 30, which conduct coolant around cylinders 8.

Figure 3:
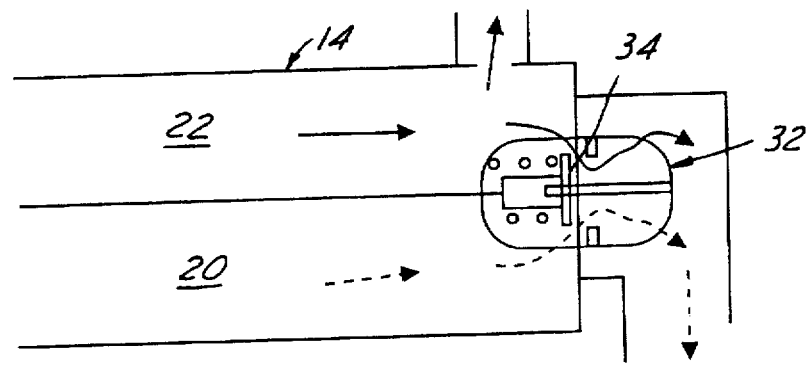
FIG. 3 is a schematic representation illustrating a thermostatic control element incorporated in a system according to the present invention.

Control of coolant flow is achieved by thermostat 32 (FIG. 3) such that, as noted above, the coolant will be stagnant in both engine block 12 and on intake side 20 of cylinder head 14. The coolant flow is only from coolant pump 26 through exhaust side 22 of cylinder head 14 and through heater core 24 before returning to pump 26 (FIG. 1-solid arrows). When the engine warms up, piston 34 of thermostat 32 opens and coolant is allowed to pass into both exhaust side 22 and intake side 20 of cylinder head 14 as well as into cylinder coolant passages 30 (FIGS. 2 and 3-dashed arrows). Coolant is also allowed to flow through second heat exchanger 28, which may comprise a conventional radiator. In effect, after warm-up has occurred, the heat dissipation subsystem is activated as a circuit for allowing maximum heat rejection of the coolant to ambient air while cooling all required parts of the engine.

Figure 4:
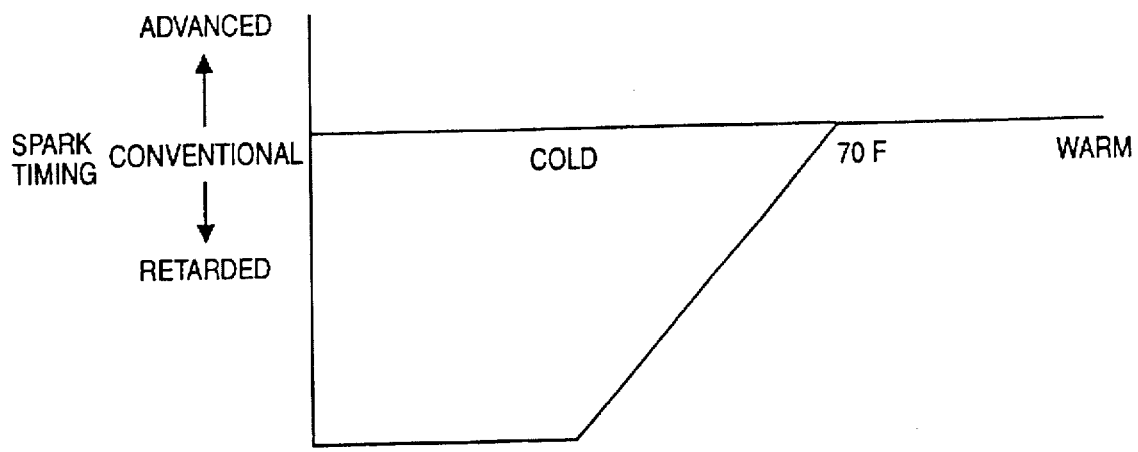
FIG. 4 is a plot illustrating a rapid heating engine control strategy according to the present invention.
Figure 5:
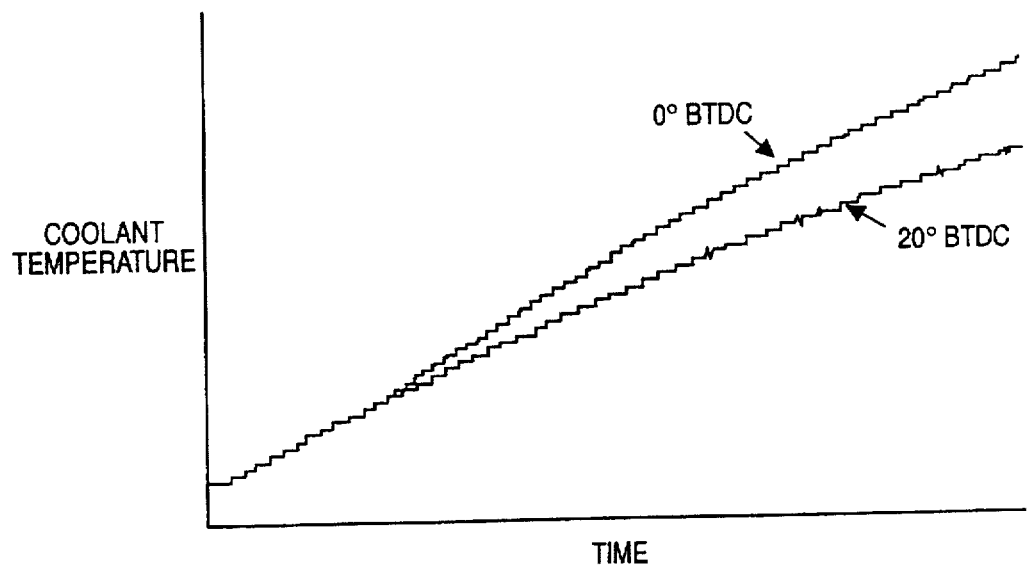
FIG. 5 is a plot illustrating the effect of implementing the control strategy of FIG. 4.
Figure 6:
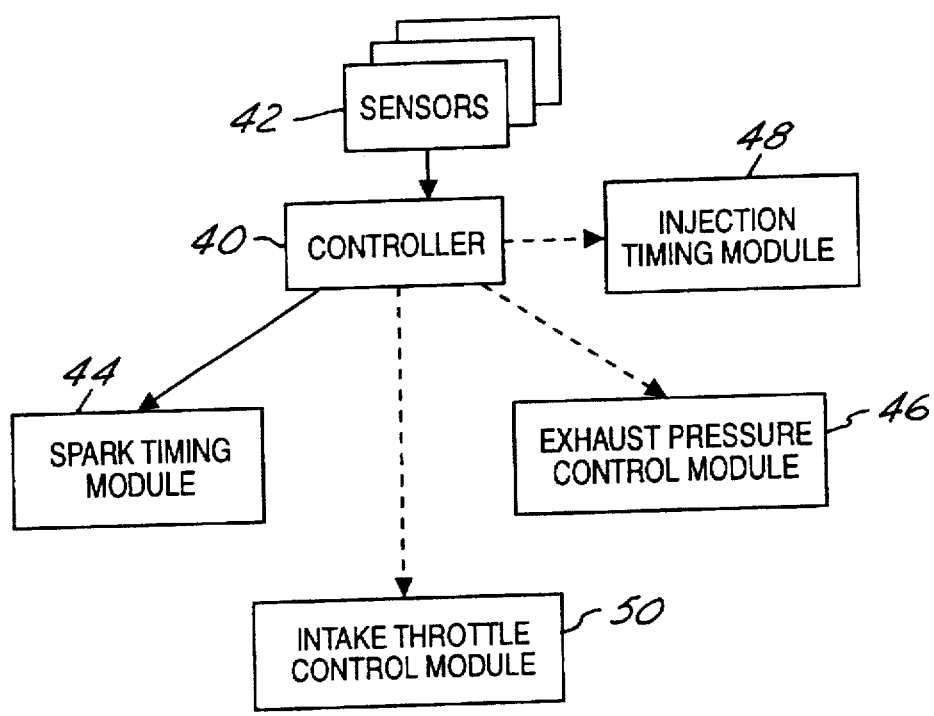
FIG. 6 illustrates a control system according to one aspect of the present invention.

The present inventive coolant flow strategy, which isolates the highest heat flux regions (exhaust side of cylinder head and exhaust port) with minimum coolant volume in the warm-up circuit, is combined with an engine operating strategy (FIG. 4) to maximize heat rejection to exhaust side 22 of cylinder head 14. As shown in FIG. 6, controller 40 receives inputs from a plurality of sensors 42, which may sense, for example, engine coolant temperature, cylinder head temperature, ambient temperature, vehicle speed, engine speed, and other variables known to those skilled in the art and suggested by this disclosure. Controller 40 operates spark timing module 44 to significantly retard spark timing so as to produce high exhaust gas temperatures. The effect of a change in operating conditions on the warm-up rate of a conventionally cooled engine is shown in FIG. 5. Generally, this strategy of retarded ignition is needed most under cold ambient conditions (<70° F. to accelerate passenger compartment heating. It should be understood that temperature conditions, including a predetermined threshold value which is, in effect, a third threshold value for controlling the high heat rejection operating mode of the present heat management system, may be selected according to the needs of any particular application of the present system. In FIG. 5, it is noted that retarding the ignition timing from 20°BTDC to 0°BTDC greatly increased the rate at which the engine rejected heat to the circulating coolant. Now, if the heat is captured by a heat intensifying subsystem according to the present invention, cab heat will be available in a vehicle in a much shorter time.

In cases in which a system according to the present invention is applied to a compression ignition engine, the heat flux to coolant within the heat intensifying subsystem may be maximized by controller 40, which may either retard the timing of fuel injection through control of injection timing module 48, or increase the operating pressure of the engine's exhaust system (not shown) by activating exhaust pressure control module 46, which may be selected from the class of exhaust pressure control devices known to those skilled in the art and suggested by this disclosure. As yet another alternative, controller 40 may operate intake throttle control module 50 so as to restrict airflow into the engine, thereby increasing the heat rejection.

While the invention has been shown and described in its preferred embodiments, it will be clear to those skilled in the arts to which it pertains that many changes and modifications may be made thereto without departing from the scope of the invention. For example, those skilled in the art will appreciate from this disclosure that techniques other than those enumerated herein may be employed for the purpose of accelerating the rejection of heat to coolant circulating within a heat intensifying subsystem according to the present invention.

We claim:

1. A heat management system for a reciprocating internal combustion engine having a cylinder block and a cylinder head with intake and exhaust valves located within the cylinder head on intake and exhaust sides, respectively, of each cylinder, with said heat management system comprising:

a heat intensifying subsystem comprising a first circuit for circulating liquid coolant exclusively between the exhaust side of the cylinder head, a first heat exchanger, and a coolant pump whenever an operating temperature of the engine is less than a first predetermined threshold; and a heat dissipation subsystem comprising a second circuit for circulating liquid coolant between the cylinder block, the intake side of the cylinder head, the exhaust side of the cylinder head, and a second heat exchanger whenever an operating temperature of the engine exceeds a second predetermined threshold.

2. A heat management system according to claim 1, wherein said heat dissipation system comprises passages for circulating coolant around the cylinder on both the intake and exhaust sides of the cylinder.

3. A heat management system according to claim 1, with said heat management system further comprising a controller for operating the engine so as to maximize the rate of rejection of heat to engine coolant within the heat intensifying subsystem whenever an operating temperature of the engine is less than said first predetermined threshold.

4. A heat management system according to claim 1, for use with a spark ignited engine, with said heat management system further comprising a controller for operating the engine so as to maximize the rate of rejection of heat to the engine coolant whenever an operating temperature of the engine is less than a third predetermined threshold.

5. A heat management system according to claim 4, wherein said controller maximizes the rejection of heat to the engine coolant by retarding the spark timing of the engine.

6. A heat management system according to claim 1, for use with a compression ignition engine, with said heat management system further comprising a controller for operating the engine so as to maximize the rate of rejection of heat to the engine coolant within the heat intensifying subsystem whenever an operating temperature of the engine is less than a third predetermined threshold.

7. A heat management system according to claim 6, wherein said controller maximizes the rejection of heat to the engine coolant by increasing a gas operating pressure of an exhaust system associated with the engine.

8. A heat management system according to claim 1, wherein said first heat exchanger provides heat to the passenger compartment of a vehicle.

9. A heat management system according to claim 1, wherein said second heat exchanger comprises an air/liquid radiator for rejecting heat to the environment.

10. A heat management system for a multicylinder reciprocating internal combustion engine having a cylinder block and a cylinder head with intake and exhaust ports and combustion chambers located within the cylinder head for servicing each cylinder, with said heat management system comprising:

a heat intensifying subsystem comprising a first circuit for circulating liquid coolant exclusively between a coolant jacket associated with both the exhaust ports and an exhaust portion of each combustion chamber as well as with a first heat exchanger and a coolant pump whenever an operating temperature of the engine is less than a first predetermined threshold; and a heat dissipation subsystem comprising a second circuit for circulating liquid coolant between the cylinder block, a coolant jacket associated with the intake ports, the coolant jacket associated with the exhaust ports, the exhaust portions of the combustion chambers, intake portions of the combustion chambers, and a second heat exchanger whenever an operating temperature of the engine exceeds a second predetermined threshold.

11. A heat management system according to claim 10, wherein said heat intensifying subsystem further comprises an engine controller for operating the engine so as to maximize the rate of rejection of heat to the engine coolant whenever an operating temperature of the engine is less than a third predetermined threshold.

12. A heat management system according to claim 10, for use with a spark ignited engine, with said heat management system further comprising a controller for operating the engine so as to maximize the rate of rejection of heat to the engine coolant whenever an operating temperature of the engine is less than a third predetermined threshold.

13. A heat management system according to claim 12, wherein said controller maximizes the rejection of heat to the engine coolant by retarding the spark timing of the engine.

14. A heat management system according to claim 10, for use with a compression ignition engine, with said heat management system further comprising a controller for operating the engine so as to maximize the rate of rejection of heat to the engine coolant whenever an operating temperature of the engine is less than a third predetermined threshold.

15. A heat management system according to claim 14, wherein said controller maximizes the rejection of heat to the engine coolant by increasing a gas operating pressure of an exhaust system associated with the engine.

16. A heat management system for a reciprocating internal combustion engine having a cylinder block and a cylinder head with intake and exhaust valves located within the cylinder head on intake and exhaust sides, respectively, of each cylinder, with said heat management system comprising:

a heat intensifying subsystem comprising:

a first circuit for circulating liquid coolant exclusively between the exhaust side of the cylinder head, a first heat exchanger, and a coolant pump whenever an operating temperature of the engine is less than a first predetermined threshold;

a controller for operating the engine so as to maximize the rate of rejection of heat to engine coolant circulating within the heat intensifying subsystem whenever an operating temperature of the engine is less than said first predetermined threshold; and a heat dissipation subsystem comprising a second circuit for circulating liquid coolant between the cylinder block, the intake side of the cylinder head, the exhaust side of The cylinder head, and a second heat exchanger whenever an operating temperature of the engine exceeds a second predetermined threshold.

* * * * *